(12) United States Patent
Rho et al.

(10) Patent No.: US 8,199,293 B2
(45) Date of Patent: Jun. 12, 2012

(54) METHOD OF MANUFACTURING LIQUID CRYSTAL DISPLAY

(75) Inventors: Soon-Joon Rho, Suwon-si (KR);
Jang-Sub Kim, Suwon-si (KR);
Baek-Kyun Jeon, Yongin-si (KR);
Hee-Keun Lee, Suwon-si (KR);
Jae-Chang Kim, Busan (KR);
Tae-Hoon Yoon, Busan (KR);
Phil-Kook Son, Busan (KR);
Bong-Kyun Jo, Busan (KR)

(73) Assignees: Samsung Electronics Co., Ltd. (KR);
Pusan National University Industry-University Cooperation Foundation (KR)

( * ) Notice: Subject to any disclaimer, the term of this patent is extended or adjusted under 35 U.S.C. 154(b) by 748 days.

(21) Appl. No.: 12/333,579

(22) Filed: Dec. 12, 2008

(65) Prior Publication Data
US 2009/0244461 A1 Oct. 1, 2009

(30) Foreign Application Priority Data

Apr. 1, 2008 (KR) ........................ 10-2008-0030251

(51) Int. Cl.
*G02F 1/1337* (2006.01)
(52) U.S. Cl. ...................................... 349/124
(58) Field of Classification Search ............... 349/124
See application file for complete search history.

(56) References Cited

U.S. PATENT DOCUMENTS

| 6,020,946 A * | 2/2000 | Callegari et al. ............ 349/124 |
| 2004/0201806 A1 | 10/2004 | Choo et al. |
| 2005/0040346 A1 | 2/2005 | Lee et al. |
| 2005/0084624 A1 | 4/2005 | Ota et al. |
| 2009/0316096 A1 * | 12/2009 | Callegari et al. ............ 349/125 |

FOREIGN PATENT DOCUMENTS

| JP | 08101390 | 4/1996 |
| JP | 08313916 | 11/1996 |
| JP | 09244027 | 9/1997 |
| JP | 10096927 | 4/1998 |
| JP | 2007163711 | 6/2007 |
| KR | 1020040041237 | 5/2004 |
| KR | 1020040083127 | 10/2004 |
| KR | 1020040098327 | 11/2004 |
| KR | 1020060082628 | 7/2006 |

OTHER PUBLICATIONS

Phil Kook Son; "Multi-domain vertical alignment of liquid crystal by the ion beam exposure on inorganic film surfaces"; Society for Information Display, May 22, 2008.

* cited by examiner

*Primary Examiner* — James Dudek
(74) *Attorney, Agent, or Firm* — Cantor Colburn LLP

(57) ABSTRACT

A method of manufacturing a liquid crystal display includes; disposing a thin film transistor having an output terminal on a first substrate, disposing a pixel electrode in connection with the output terminal, disposing an inorganic layer on the pixel electrode, and converting the inorganic layer to a first alignment layer by disposing a mask on the inorganic layer and radiating an ion beam in a plurality of directions.

19 Claims, 14 Drawing Sheets

METHOD OF MANUFACTURING LIQUID CRYSTAL DISPLAY

This application claims priority to Korean Patent Application No. 10-2008-0030251, filed on Apr. 1, 2008, and all the benefits accruing therefrom under 35 U.S.C. §119, the contents of which in its entirety are herein incorporated by reference.

BACKGROUND OF THE INVENTION (a) Field of the Invention

The present invention relates to a method of manufacturing a liquid crystal display. More particularly, the present invention relates to a method of manufacturing a liquid crystal display using an ion beam alignment method.

(b) Description of the Related Art

A liquid crystal display ("LCD") is a widely used display device. It typically includes two display panels on which field generation electrodes are formed and a liquid crystal layer interposed therebetween. Varying amounts of light are then selectively transmitted through the display by controlling alignment of liquid crystal molecules of the liquid crystal layer by applying a voltage to the field generation electrodes.

Although LCDs have a drawback of a narrow viewing angle due to optical anisotropy of liquid crystal molecules, the LCD realizes a wide viewing angle through development of an optically compensated bend ("OCB") mode, an in-plain switching ("IPS") mode and various vertically aligned modes using a plurality of domains. The plurality of domains may be formed by artificially distorting an electric field.

As a means of forming a plurality of domains, a protrusion or a cutout in a field generation electrode may be used. In operation, as liquid crystal molecules are aligned in a direction perpendicular to a fringe field formed between an edge of a protrusion or a cutout and a field generation electrode that is opposite thereto, a plurality of domains are formed. However, because a process of forming a protrusion or a cutout is difficult and complicated, the manufacturing cost of the display device increases, and furthermore, the plurality of cutouts or protrusions decreases an aperture ratio of the display.

Furthermore, although liquid crystal molecules that are positioned adjacent to a protrusion or a cutout can be easily aligned in a direction perpendicular to a fringe field, a random motion occurs in liquid crystal molecules that are positioned at a central part that is relatively far away from the cutout, and therefore the response speed becomes slow and a backward direction domain is formed, whereby an afterimage may be displayed.

As a means of forming a plurality of domains in one pixel, an alignment layer that controls an alignment direction and an alignment angle of liquid crystal molecules by radiating light or ions to an organic or inorganic layer may be used. In operation, because it is unnecessary to form a protrusion or a cutout in a field generation electrode the aperture ratio can be increased, and by generating a pretilt angle with the alignment layer, the response speed of the liquid crystal molecules can be increased.

However, the method of forming an alignment layer with light is a method of forming a plurality of domains by radiating ultraviolet rays (UV) in a plurality of directions in every pixel on a surface of an organic layer on a substrate, and the method of forming an alignment layer with an ion beam is a method of forming a plurality of domains by radiating an ion beam in a plurality of directions in every pixel on a surface of an inorganic layer that is formed on a substrate.

However, in the method of forming the alignment layer with light, because an afterimage problem due to an uncured organic material component exists and anchoring energy sequentially becomes weak, initial alignment of the liquid crystal molecules may be somewhat random. A mask is used when forming a plurality of domains using light or an ion beam, and in this case, at a border portion of the mask, an alignment failure region at which light or an ion beam (which may be Ar ions) is indirectly radiated is generated. If the alignment failure region is not completely blocked by a light blocking member, a display failure is generated. A display failure according to an alignment failure region can be checked by testing a liquid crystal molecule alignment state after manufacturing the liquid crystal display, as shown in FIG. 16.

BRIEF SUMMARY OF THE INVENTION

The present invention provides an exemplary embodiment of a method of manufacturing a liquid crystal display having advantages of preventing a display failure by reducing an alignment failure region and sustaining great anchoring energy.

An exemplary embodiment of a liquid crystal display according to the present invention includes; a first substrate, a gate line disposed on the first substrate, a data line disposed substantially perpendicular to the gate line on the first substrate, a plurality of thin film transistors disposed on the first substrate, a plurality of pixel electrodes disposed connected to the plurality of thin film transistors, respectively, a first inorganic alignment layer, in which at least two alignment regions each having a substantially opposite alignment direction and each alignment direction being substantially parallel to one of the data line and the gate line, is disposed on the plurality of pixel electrodes, a second substrate disposed corresponding to the first substrate, a common electrode disposed on the second, and a second inorganic alignment layer, in which at least two alignment regions each having a substantially opposite alignment direction and each alignment direction being different from the alignment directions of the first inorganic alignment layer and substantially parallel to the other of the gate line and the data line, is disposed on the common electrode.

In one exemplary embodiment, the first inorganic alignment layer may include different alignment regions within one pixel, and the second inorganic alignment layer may include different alignment regions within one pixel.

In one exemplary embodiment, the first inorganic alignment layer may include different alignment regions formed in different pixels, and the second inorganic alignment layer may include different alignment regions formed in different pixels.

In one exemplary embodiment, an incident angle of the ion beam of the first and second inorganic alignment layers may be about 60° to about 85° relative to a horizontal plane of the first or second substrates, respectively, and an energy of the ion beam may be about 50 eV to about 70 eV, and flux density of the ion beam may be about $2.5 \times 10^{13}$ Ar$^+$/sec.cm$^2$ to about $3.12 \times 10^{13}$ Ar$^+$/sec.cm$^2$.

In one exemplary embodiment, a thickness of the inorganic layer may be about 50 nm.

In one exemplary embodiment, the inorganic layer may include one of a silicon oxide and a silicon nitride.

An exemplary embodiment of a method of manufacturing a liquid crystal display according to the present invention includes; disposing a thin film transistor including an output terminal on a first substrate, disposing a pixel electrode in connection with the output terminal, disposing an inorganic layer on the pixel electrode, and converting the inorganic layer to a first alignment layer by disposing a mask on the inorganic layer and radiating an ion beam thereto.

In one exemplary embodiment, the converting of the inorganic layer to a first alignment layer may include; dividing the first alignment layer into a plurality of stripe regions including first and second stripe regions, radiating the ion beam to the first stripe region in a first direction, and radiating the ion beam to the second stripe region adjacent to the first stripe region in a second direction substantially opposite to the first direction.

In one exemplary embodiment, the first stripe region and the second stripe region may be formed within one pixel.

In one exemplary embodiment, the first stripe region and the second stripe region may be formed in different pixels, respectively.

In one exemplary embodiment, a distance between the inorganic layer and the mask may be about 100 μm or less when radiating the ion beam.

In one exemplary embodiment, in the converting of the inorganic layer to a first alignment layer, an incident angle of the ion beam may be about 60° to about 85° with respect to the first substrate.

In one exemplary embodiment, in the converting of the inorganic layer to a first alignment layer, energy of the ion beam may be about 50 eV to about 70 eV, and flux density of the ion beam may be about $2.5 \times 10^{13}$ Ar$^+$/sec.cm$^2$ to about $3.12 \times 10^{13}$ Ar$^+$/sec.cm$^2$.

In one exemplary embodiment, in the disposing of the inorganic layer on the pixel electrode, the inorganic layer may be deposited by a high frequency magnetron sputtering method, and the deposition temperature may be about 75° C. to about 300° C.

In one exemplary embodiment, the ion beam source may be a CHC type of ion beam source.

In one exemplary embodiment, the ion beam may include argon ions.

In one exemplary embodiment, the method may further include; disposing a common electrode on a second substrate disposed substantially opposite to the first substrate, disposing an inorganic layer on the common electrode, converting the inorganic layer to a second alignment layer by radiating an ion beam thereto, and disposing a liquid crystal layer between the first alignment layer and the second alignment layer.

In one exemplary embodiment, the converting of the inorganic layer to a second alignment layer may include dividing the second alignment layer into a plurality of stripe regions including third and fourth stripe regions, radiating the ion beam to the third stripe region in a third direction, and radiating the ion beam to the fourth stripe region adjacent to the third stripe region in a fourth direction substantially opposite to the third direction.

In one exemplary embodiment, the third stripe region and the fourth stripe region may be formed within one pixel or may be formed in different pixels, respectively.

In one exemplary embodiment, the liquid crystal layer may include a plurality of domains including at least left upper, left lower, right upper, and right lower domains.

In one exemplary embodiment, a distance between the inorganic layer and the mask may be about 20 μm to about 50 μm when radiating the ion beam.

In one exemplary embodiment, the mask may have an opening through which the ion beam passes, and a width of the opening may be about 100 μm to about 2000 μm.

In one exemplary embodiment, the mask may be made of one of stainless steel and aluminum.

According to an exemplary embodiment of the present invention, by reducing an alignment failure region, a display failure can be prevented and great anchoring energy can be sustained. Further, by aligning with the ion beam, a plurality of domains can have high thermal stability.

BRIEF DESCRIPTION OF THE DRAWINGS

The above and other features and advantages of the present invention will become more apparent by describing in detailed exemplary embodiments thereof with reference to the accompanying drawings, in which.

DETAILED DESCRIPTION OF THE INVENTION

Figure 1:
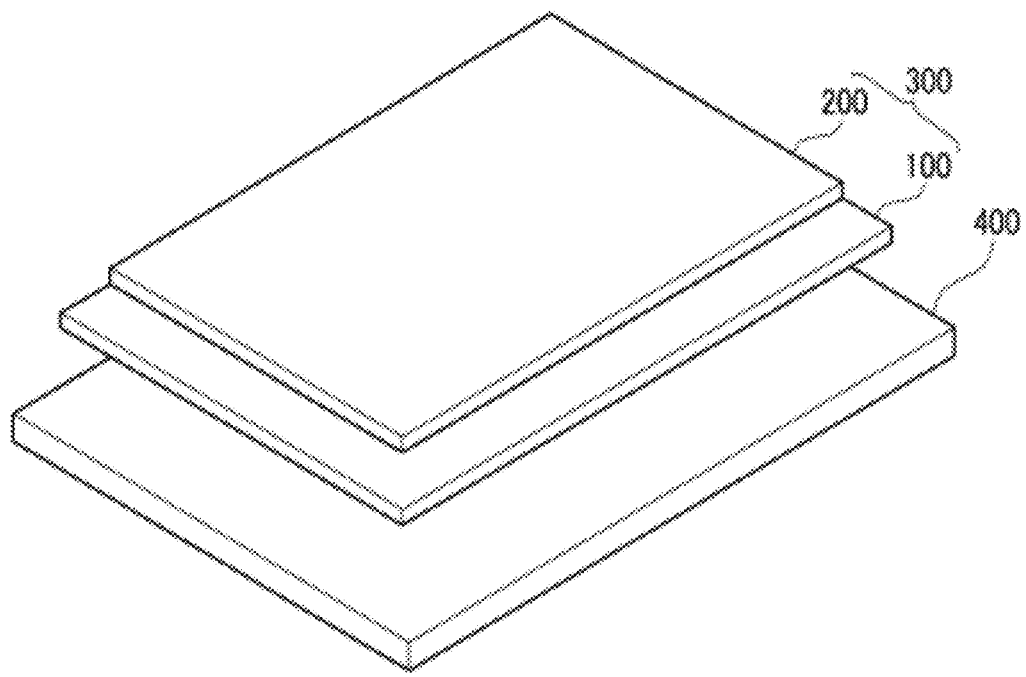
FIG. 1 is a front perspective view of an exemplary embodiment of a liquid crystal display ("LCD") according to the present invention.

The invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another elements as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments of the present invention are described herein with reference to cross section illustrations that are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present invention.

Hereinafter, the present invention will be described in detail with reference to the accompanying drawings.

An exemplary embodiment of a liquid crystal display ("LCD") according to the present invention is described hereinafter with reference to FIGS. 1 and 2.

Figure 2:
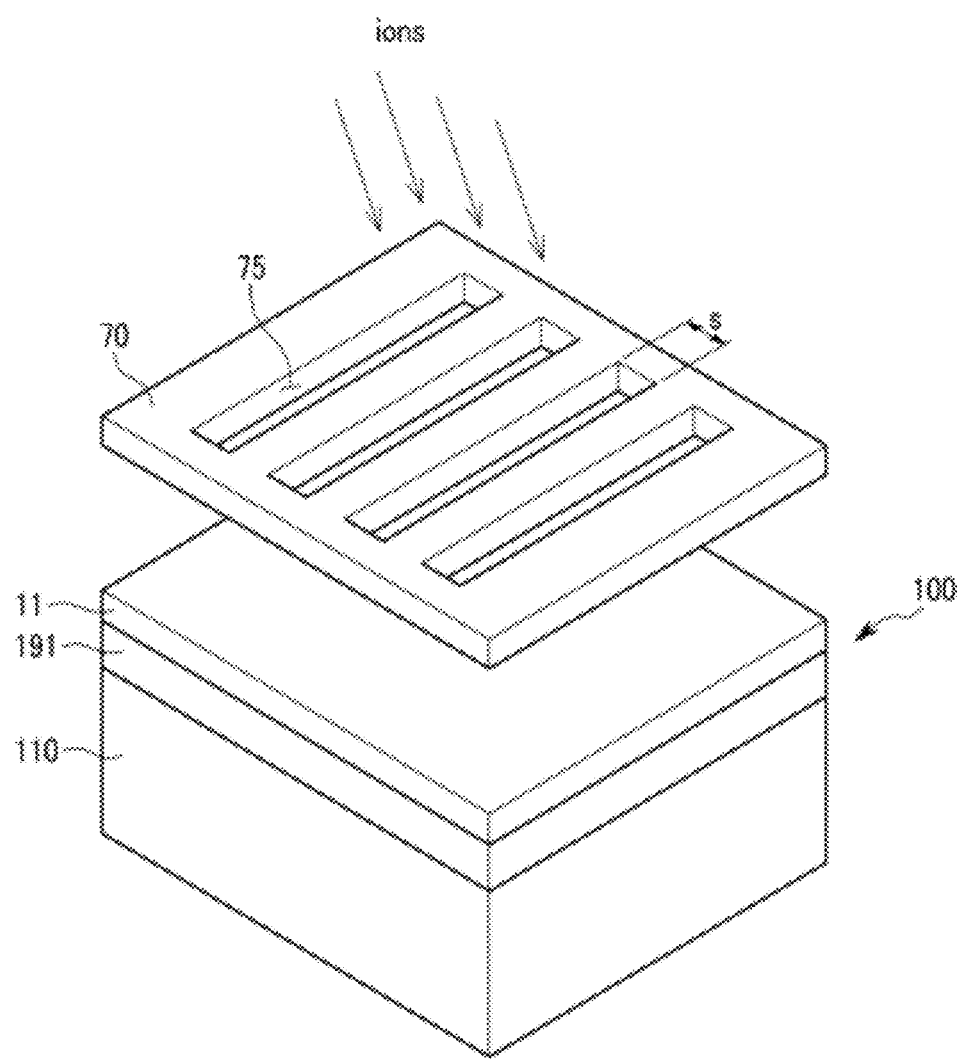
FIG. 2 is a front perspective view illustrating an exemplary embodiment of a mask for aligning an ion beam and a thin film transistor ("TFT") array panel of FIG. 1.

FIG. 1 is a front perspective view of an exemplary embodiment of an LCD according to the present invention, and FIG. 2 is a front perspective view illustrating an exemplary embodiment of a mask for aligning an ion beam and a thin film transistor ("TFT") array panel of FIG. 1.

Referring to FIGS. 1 and 2, the LCD includes a display panel 300 and a lighting unit 400. The display panel 300 includes a TFT array panel 100, a common electrode panel 200, and a liquid crystal layer (not shown) therebetween.

First, the TFT array panel 100 is described. The TFT array panel 100 includes a substrate 110, a pixel electrode 191, and an alignment layer 11.

The substrate 110 is made of a transparent insulating material, exemplary embodiments of which include glass, plastic or other similar materials. The pixel electrode 191 is formed on the substrate 110. The pixel electrode 191 is made of a transparent conductive material, exemplary embodiments of which include indium tin oxide ("ITO"), indium zinc oxide ("IZO") or other similar materials.

A plurality of thin film element structures (not shown) are formed between the substrate 110 and the pixel electrode 191. The thin film element structure may include a TFT, a signal line such as a gate line and a data line, a color filter, a light blocking member or various other components as would be known to one of ordinary skill in the art. An exemplary embodiment of the thin film element structure is briefly described below.

In the current exemplary embodiment, the gate line may be formed on the substrate 110. A gate insulating layer, a semiconductor, and an ohmic contact may be sequentially formed on the gate line, and a data line and a drain electrode may be formed thereon. The gate line may include a plurality of gate electrodes, and the data line may include a plurality of source electrodes. Together, the gate electrode, the semiconductor, the source electrode, and the drain electrode constitute a TFT. A passivation layer may be formed on the semiconductor, the data line, and the drain electrode, and the pixel electrode 191 may be positioned on the passivation layer. The pixel electrode 191 may be connected to the drain electrode through a contact hole formed in the passivation layer. In one exemplary embodiment, the thin film element structure may include a color filter, a common electrode, or both the color filter and the common electrode formed on the semiconductor. Alternative exemplary embodiments include configurations wherein the components of the thin film element may include or omit various components as would be known to one of ordinary skill in the art.

The alignment layer 11 may be formed on the pixel electrode 191 and may be a vertical alignment layer. In one exemplary embodiment, the alignment layer 11 may be made of an inorganic material, exemplary embodiments of which include silicon nitride (SiNx), silicon oxide (SiOx) and other materials having similar characteristics.

The common electrode panel 200 is disposed substantially opposite to the TFT array panel 100 and also may include a plurality of thin film element structures. An exemplary embodiment of a structure of the common electrode panel 200 is described in more detail with reference to FIG. 8.

Figure 8:
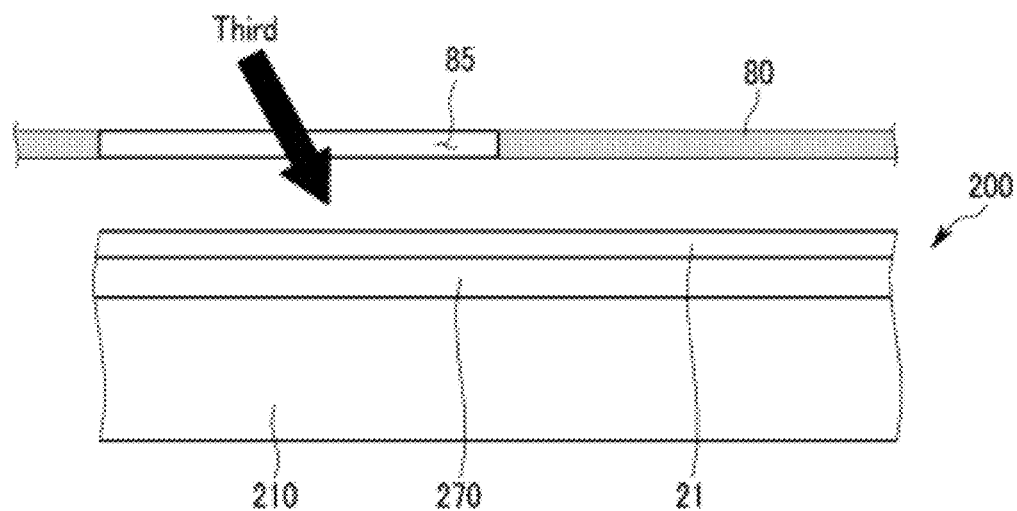

Referring now to FIGS. 1 and 8, a light blocking member (not shown) may be formed on a substrate 210, and the light blocking member may be disposed substantially opposite to the pixel electrode 191 and have a plurality of openings having a shape that is substantially identical to that of the pixel electrode 191. An overcoat may be formed on the substrate 210 and the light blocking member, and a common electrode 270 may be formed on the overcoat.

A plurality of color filters may be formed between the substrate 210 and the passivation layer. In another exemplary embodiment, a passivation layer may be formed underneath the common electrode 270 to provide a planar layer for the deposition of the common electrode 270. Each color filter may be formed such that the majority of the color filter is disposed within an opening of the light blocking member, and in one exemplary embodiment, may display one of three primary colors of red, green and blue colors. The color filter may be omitted in the common electrode panel 200.

An alignment layer 21, exemplary embodiments of which may be made of an inorganic material, may be formed on the common electrode 270. The alignment layers 11 and 21 may include a plurality of regions having different alignment directions in every pixel, or may have different alignment directions between neighboring pixels. In the exemplary embodiment wherein the alignment layers 11 and 21 have different alignment directions between neighboring pixels, a liquid crystal layer is interposed between the alignment layers 11 and 21. Liquid crystal molecules of the liquid crystal layer that are positioned at one pixel are controlled to have different alignment directions than a neighboring pixel, and thus a plurality of domains are formed. The alignment direction of the liquid crystal molecules may be determined by an anchoring energy, and the anchoring energy may be greatly influenced by radiating an ion beam onto the inorganic layer to form an alignment layer 11 or 12. One of the alignment layers 11 and 21 may be formed by an ion beam radiated in a direction substantially parallel to a gate line, and the other may be formed by an ion beam radiated in a direction substantially parallel to a data line, e.g., the directions of ion radiation used to form each alignment layer may be substantially perpendicular.

In order to convert the inorganic layer to the alignment layers 11 and 21 by radiating an ion beam to the inorganic layer, a mask 70 having a plurality of openings 75 is required. The mask 70 used when forming the alignment layer with the ion beam includes the plurality of openings 75 formed in a direction perpendicular to a longitudinal side of the substrate 110. Furthermore, in alternative exemplary embodiments, the mask 70 may have a plurality of openings 75 formed in parallel to a longitudinal side of the substrate 110. In yet another exemplary embodiment, the mask 70 may have openings 75 formed therein and may be rotated so that the openings 75 may be aligned to be parallel to, or perpendicular to, the longitudinal side of the substrate 110. In one exemplary embodiment, a width of the opening 75 of the mask 70 may be about 100 μm to about 2000 μm. In one exemplary embodiment, the mask 70 may be made of stainless steel, aluminum or other similar materials.

Referring again to FIG. 1, the lighting unit 400 supplies light to the display panel 300 and may, in exemplary embodiments, may include a light source, a light guide and a reflection member. Exemplary embodiments include configurations wherein a fluorescent lamp or a light emitting diode ("LED") may be used as the light source, and, in such exemplary embodiments, it radiates light of a fixed brightness regardless of a state of the LCD. The light guide induces light radiated from the light source to travel in a direction towards the display panel 300, and the reflection member minimizes optical loss by reflecting light from the light guide toward the display panel 300.

An exemplary embodiment of a method of manufacturing an exemplary embodiment of an LCD according to the present invention is described with reference to FIGS. 3 to 11.

Figure 9:
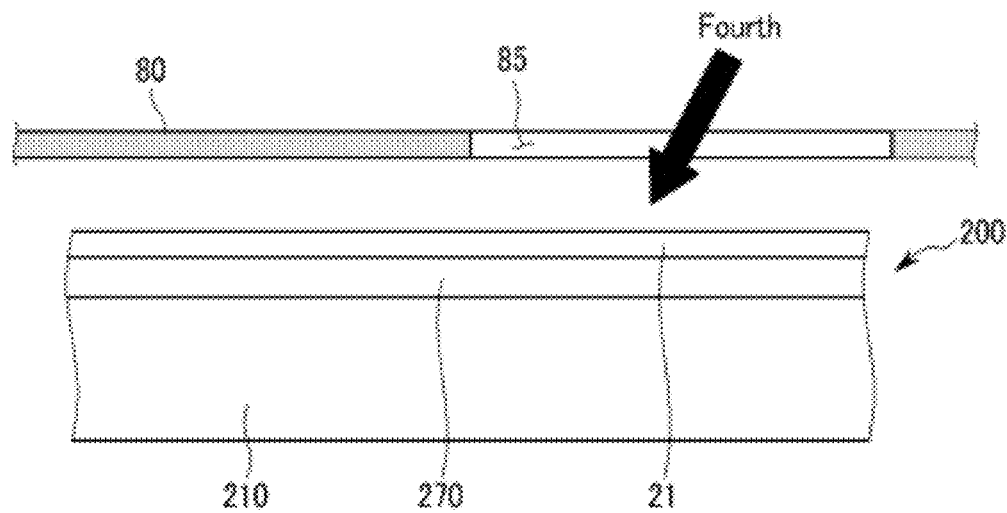
Figure 10:
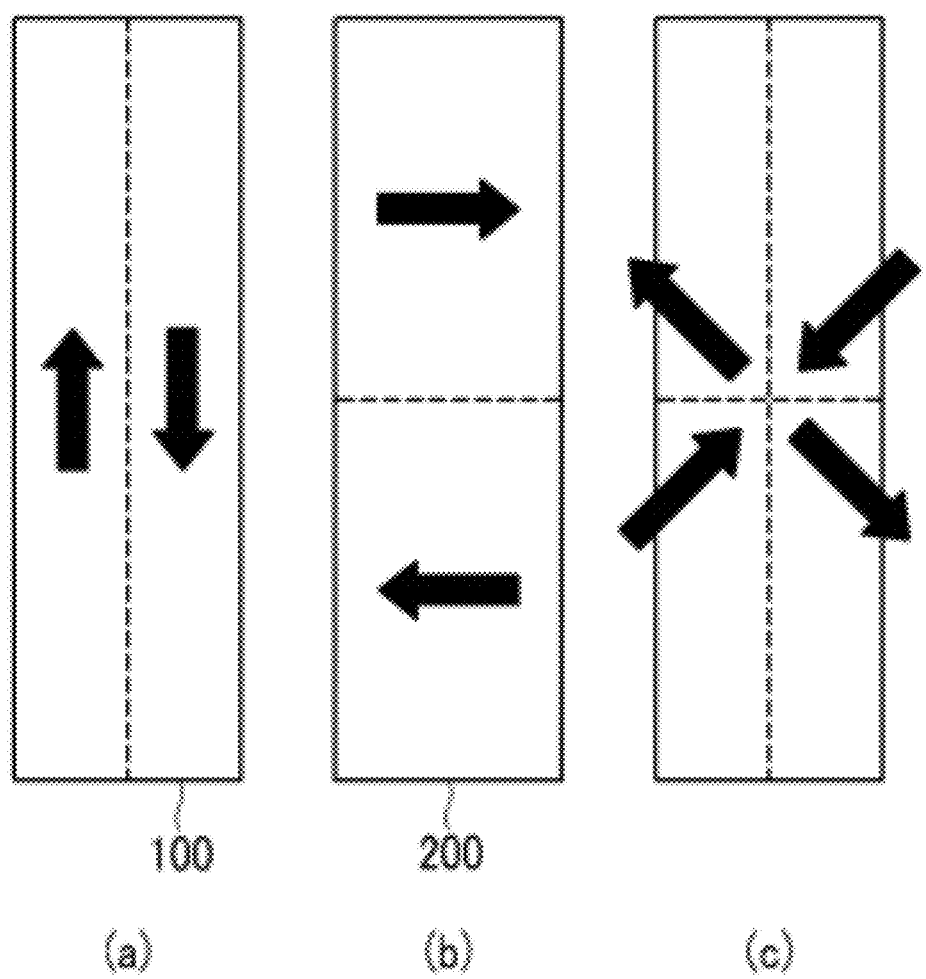
FIGS. 10 and 11 are schematic diagrams illustrating an exemplary embodiment of an alignment direction of liquid crystal molecules formed using the exemplary embodiment of a method described in FIGS. 3-9.
Figure 11:
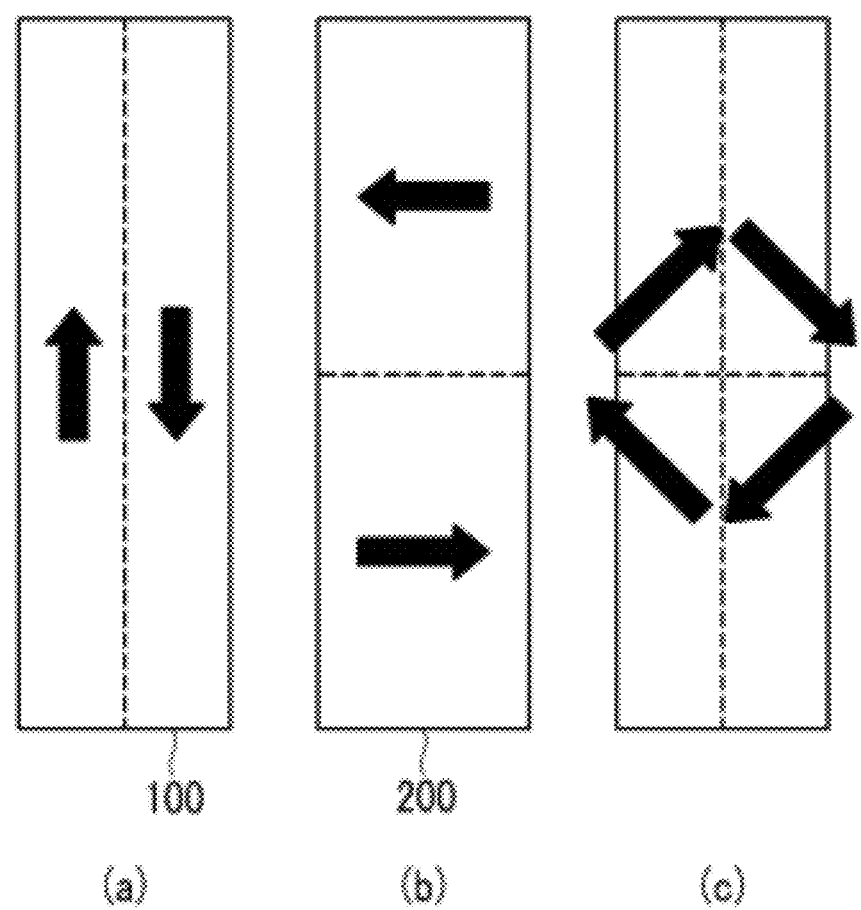

FIGS. 3 to 11 are cross-sectional views illustrating an exemplary embodiment of a method of manufacturing an exemplary embodiment of an LCD according to the present invention. Particularly, FIG. 5 is a schematic diagram illustrating exemplary embodiments of two masks used when forming the exemplary embodiment of an alignment layer with the ion beam, FIGS. 6 to 9 are schematic diagrams illustrating an exemplary embodiment of a method of radiating an ion beam using the exemplary embodiment of a mask of FIG. 5, and FIGS. 10 and 11 are schematic diagrams illustrating exemplary embodiments of an alignment direction of liquid crystal molecules formed using the exemplary embodiment of a method.

Figure 3:
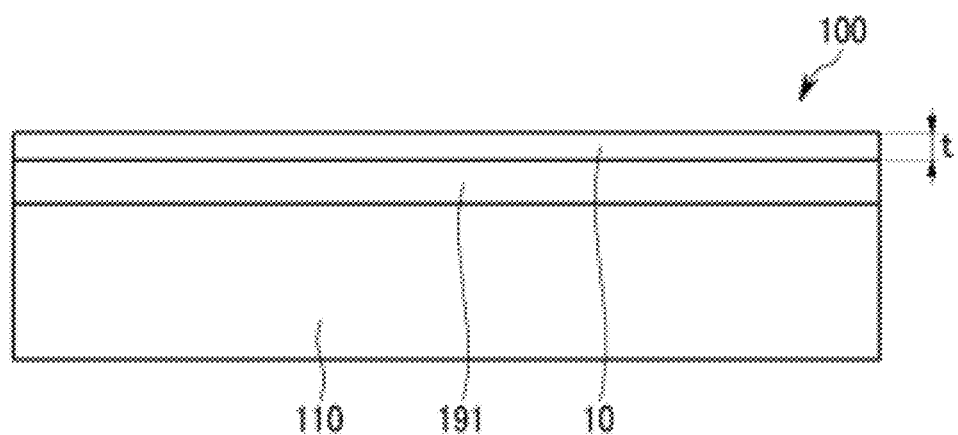
FIGS. 3-4 and 6-9 are cross-sectional views illustrating an exemplary embodiment of a method of manufacturing an exemplary embodiment of an LCD according to the present invention.

As shown in FIG. 3, a thin film element structure, which may include elements such as various signal lines (not shown) and a TFT (not shown), is formed on the substrate 110, and then a pixel electrode 191 connected to an output terminal of the TFT is formed on the thin film element structure.

Next, an inorganic layer 10, exemplary embodiments of which may be formed by stacking amorphous silicon oxide, is disposed on the pixel electrode 191. In one exemplary embodiment, the inorganic layer 10 can be deposited using a high frequency magnetron sputtering method, one exemplary embodiment of which is RF magnetron sputtering. A thickness (t) of the inorganic layer 10 may be 50 nm, and a deposition temperature thereof may be 75° C. to 300° C.

Figure 4:
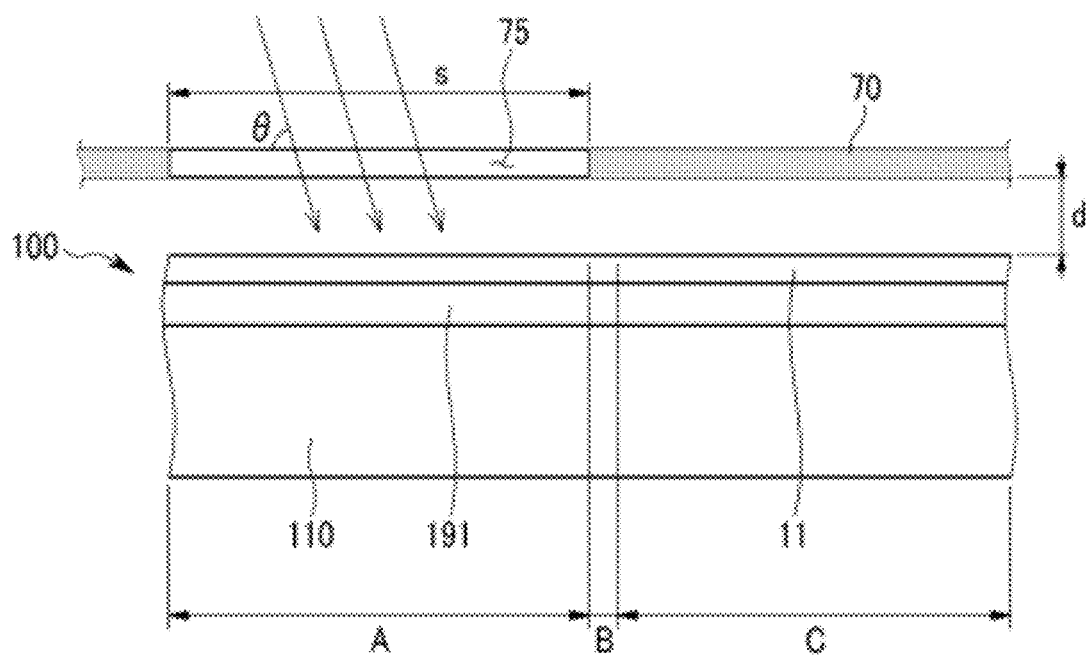

Next, as shown in FIG. 4, the mask 70 is disposed on the inorganic layer 10 and an ion beam is radiated to a region A through the opening 75. In the current exemplary embodiment, the ion beam is obliquely radiated at a predetermined angle (θ). Thereafter, after the opening 75 of the mask 70 is disposed on a region C and the ion beam is radiated to the region C. In the current exemplary embodiment, the ion beam is obliquely radiated at a predetermined angle (θ), as in the first radiation exposure. However, alternative exemplary embodiments include configurations wherein the ion beam may be obliquely radiated at a predetermined angle (−θ) in a direction opposite to the first radiation direction. In either exemplary embodiment, the inorganic layer 10 is converted to the alignment layer 11 via the radiating with the ion beam. Here, a region B is an alignment failure region, for example, a region to which the ion beam is indirectly radiated.

In the present exemplary embodiment, an incident angle (θ) of the ion beam may be from about 60° to about 85°, and the power setting of the ion beam may be from about 50 eV to about 70 eV, and a flux density of the ion beam may be from about $2.5 \times 10^{13}$ Ar$^+$/sec.cm$^2$ to about $3.12 \times 10^{13}$ Ar$^+$/sec.cm$^2$. In one exemplary embodiment, a width (s) of the opening 75 of the mask 70 may be about 100 μm to about 2000 μm, and a distance (d) between the mask 70 and a surface of the alignment layer 11 may be about 100 μm or less. When radiating the ion beam at the opposite angle, only the angle thereof changes to become −θ and the remaining conditions of the incident beam may be substantially identical to the above-described conditions.

When aligning the ion beam under such conditions, anchoring energy may be secured to $2 \times 10^{-4}$ J/m$^2$ or more, and thermal stability of a plurality of domains is secured up to about 120° C. A width of the alignment failure region (B) may be 20 μm or less. When the width of the alignment failure region (B) is 20 μm or less, a display failure may be avoided because the failure region (B) of the alignment layer may be substantially blocked by the light blocking member, or in an exemplary embodiment, the failure region (B) may be completely covered by the light blocking member.

Conditions for forming the alignment layer 21 of the common electrode panel 200 are substantially identical to the above-described conditions.

Next, a liquid crystal layer is deposited on the TFT array panel 100 or on the common electrode panel 200 having the common electrode 270 and the alignment layer 21, and then the two display panels 100 and 200 are coupled. However, in another exemplary embodiment, the liquid crystal layer may be injected between the display panels 100 and 200 after the display panels 100 and 200 are coupled. A plurality of domains having different pretilt directions can be formed by forming the alignment layers 11 and 21 having different alignment directions.

Figure 5A:
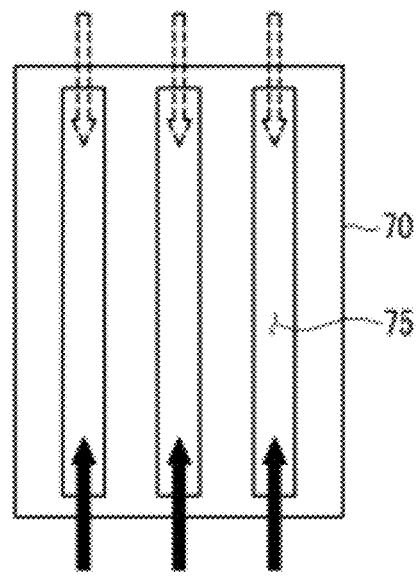
FIG. 5A is a schematic diagram illustrating an exemplary embodiment of a first mask used when forming an exemplary embodiment of an alignment layer with an ion beam.
Figure 5B:
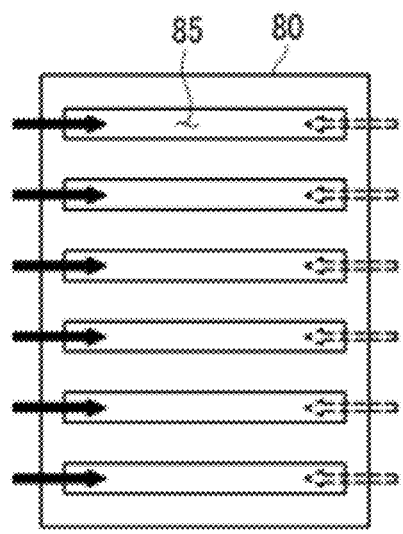
FIG. 5B is a schematic diagram illustrating an exemplary embodiment of a second mask used when forming an exemplary embodiment of an alignment layer with an ion beam.

An exemplary embodiment of a method of forming the alignment layer with the ion beam is described in detail with reference to FIGS. 5 to 9. Referring to FIGS. 5A and 5B, when forming the alignment layer with the ion beam, a first mask 70 in which a plurality of openings 75 are formed in a direction substantially parallel to a longitudinal side of the substrate and a second mask 80 in which a plurality of openings 85 are formed in a direction substantially perpendicular to a longitudinal side of the substrate may be used.

Figure 6:
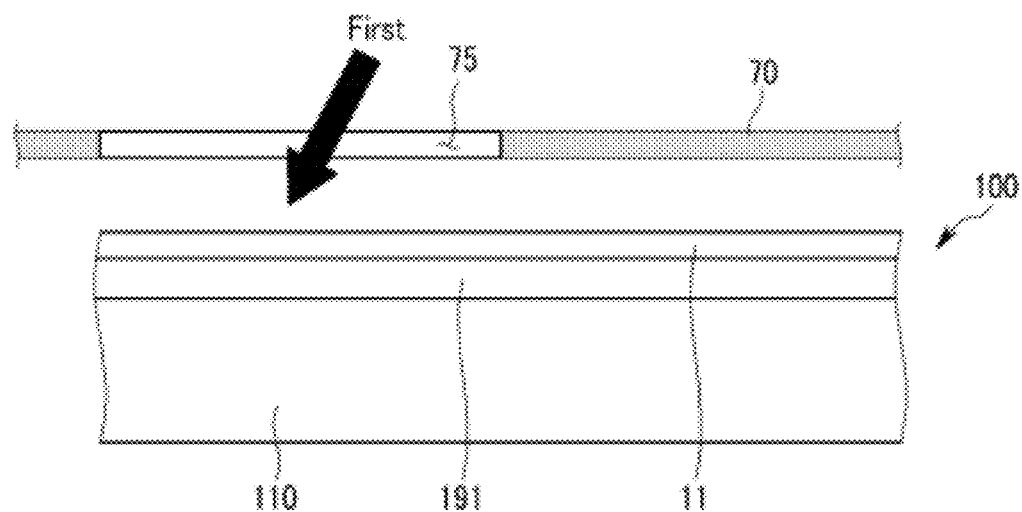
Figure 7:
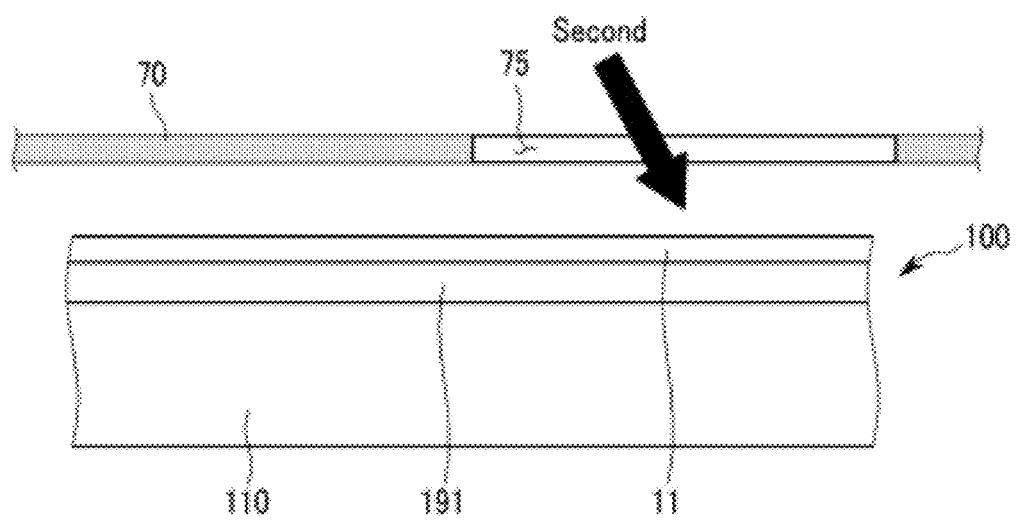

Referring to FIGS. 5A, 6, and 7, the first mask 70 is disposed on the TFT array panel 100 in which the alignment layer 11 is coated and an ion beam, exemplary embodiments of which include argon ions or CHC-type ions, is firstly radiated in an oblique angle. Thereafter, the ion beam is secondarily obliquely radiated in a direction substantially opposite to that of the first radiation.

In the current exemplary embodiment, the ion beam is radiated while moving along a first direction, e.g., a vertical direction (as indicated by the filled-in and dotted line arrows) in FIG. 5A, in parallel to a longitudinal axis of the opening 75 of the mask 70. An exemplary embodiment of a method of obliquely radiating the ion beam on a surface of the alignment layer 11 can be performed by inclining either the substrate 110 or an ion beam radiation apparatus (not shown) with respect to one another.

In the current exemplary embodiment, in the left half of a pixel area, the ion beam may be radiated to have an inclination direction from the lower side to the upper side, and in the right half of a pixel area, the ion beam is radiated to have an inclination direction from the upper side to the lower side. In an alternative exemplary embodiment, the left half of a pixel area may be radiated to have an inclination direction from the upper side to the lower side, and the right half of a pixel area may be radiated to have an inclination direction from the lower side to the upper side. Accordingly, as shown in section (a) of FIGS. 10 and 11, two regions with opposite inclination directions may be formed.

Similarly, referring to FIGS. 5B, 8, and 9, the second mask 80 is disposed on the common electrode panel 200 in which the alignment layer 21 is coated, and an ion beam, exemplary embodiments of which include argon ions, is thirdly obliquely radiated. Thereafter, the ion beam is fourthly obliquely radiated in a direction substantially opposite to the third radiation direction.

In the current exemplary embodiment, the ion beam is radiated while moving along a direction, e.g., a lateral direction (as indicated by the filled in and dotted line arrows) in FIG. 5B, substantially in parallel to a longitudinal axis of the opening 85 of the mask 80. In the present exemplary embodiment, in the upper half of the pixel area the ion beam is radiated to have an inclination direction from the left side to the right side, and in the lower half of the pixel area the ion beam is radiated to have an inclination direction from the right side to the left side, and thus as shown in section (b) of FIG. 10, two regions with opposite inclination directions may be formed. In another exemplary embodiment, the ion beam may be radiated to have an inclination direction from the right side to the left side in the upper half of the pixel area, and the ion beam may be radiated to have an inclination direction from the left side to the right side in the lower half of the pixel area, and thus as shown in section (b) of FIG. 11, two regions with opposite inclination directions may be formed.

By radiating the ion beam to an oblique angle to surfaces of the alignment layers 11 and 21, an effect in which a surface of the alignment layers 11 and 21 is rubbed in a fixed direction is obtained. That is, because the surface of the alignment layers 11 and 21 has different alignment directions according to a radiation direction of the ion beam, by dividing one pixel into a plurality of regions and radiating the ion beam to the plurality of regions, a plurality of domains in which a pretilt direction of liquid crystal molecules is different can be formed in one pixel.

Referring to FIGS. 10 and 11, when coupling a TFT array panel 100 as shown in section (a) of FIGS. 10 and 11, in which the ion beam is radiated in opposite directions in left and right halves, and a common electrode panel 200 as shown in section (b) of FIGS. 10 and 11, in which the ion beam is radiated in opposite directions in upper and halves lower halves, four domains that are aligned in directions of left upper, left lower, right upper, and right lower can be formed, as shown in section (c) of FIGS. 10 and 11. Although two exemplary embodiments of a pixel having four domains is shown in FIGS. 10 and 11, it would be apparent to one of ordinary skill in the art that the ion beam radiation may be performed in order to generate additional domains, or to rearrange the ionization pattern to create domains with different pretilt directions than those shown in sections (c) of FIGS. 10 and 11.

As described above, an exemplary embodiment in which a plurality of domains are formed in one pixel by dividing one pixel into a plurality of stripe regions and radiating an ion beam in different directions is illustrated, but by forming a plurality of pixels in one stripe region and radiating an ion beam in opposite directions in neighboring stripe regions, an alignment direction of liquid crystal molecules in neighboring pixels may be differently formed. In one exemplary embodiment, in an LCD including 4 pixels constituting a 2×2 matrix, when coupling a TFT display panel in which an ion beam is radiated in opposite directions in a left pixel column and a right pixel column and a common electrode panel in which an ion beam is radiated in opposite directions in an upper pixel row and a lower pixel row, liquid crystal molecules may be aligned in different directions in each of the four pixels. For convenience of description, the individual pixels will be labeled left upper, left lower, right upper and right lower according to their position within the 2×2 matrix.

An effect that is generated when the alignment layer is formed with the ion beam according to the conditions and method that are described above is described with reference to FIGS. 3 and 4 and the experimental data illustrated in FIGS. 12 to 15.

Figure 12:
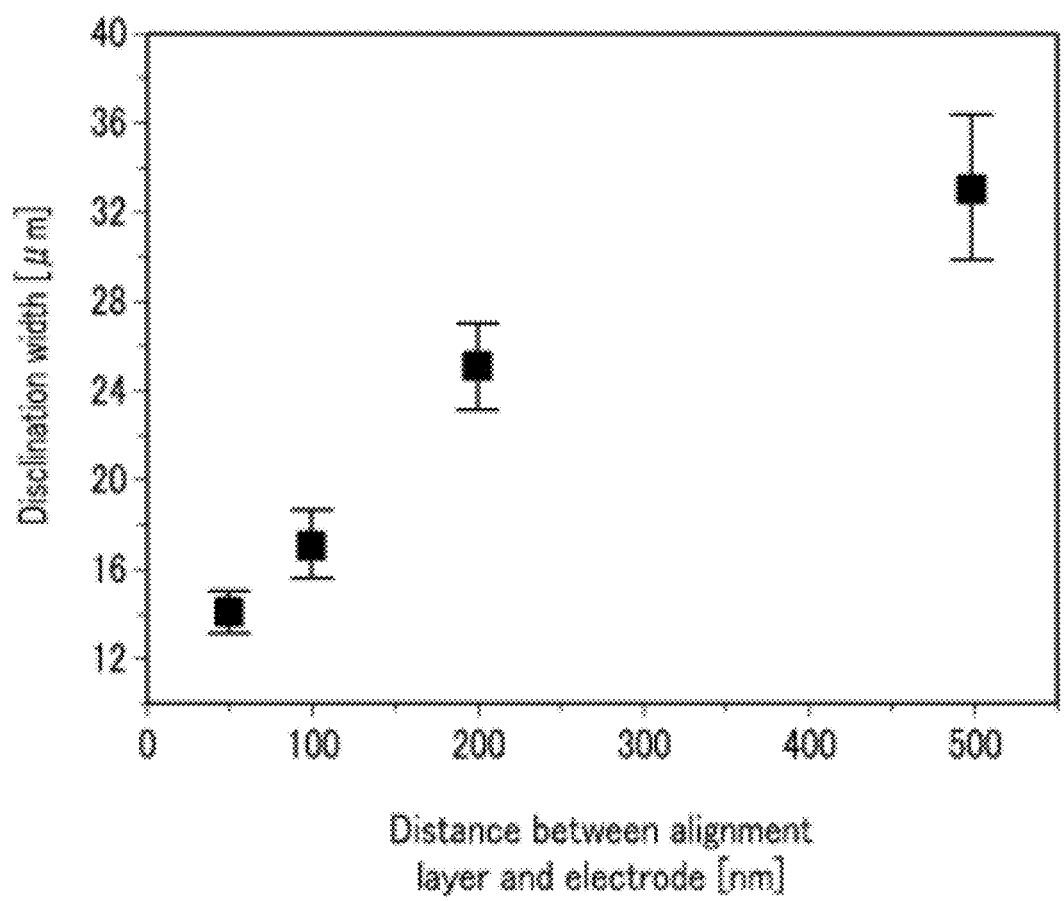
FIG. 12 is a graph illustrating a size of an alignment failure region according to a distance between an alignment layer and a mask.
Figure 13:
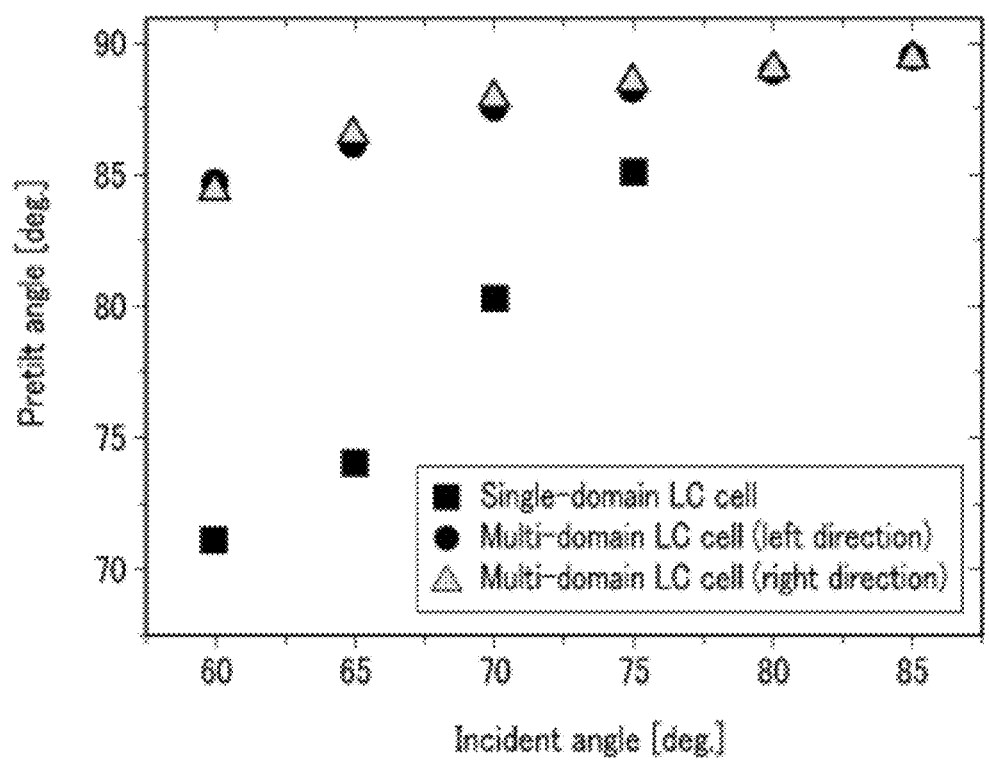
FIG. 13 is a graph illustrating a magnitude of a pretilt angle according to an incident angle of an ion beam.
Figure 14:
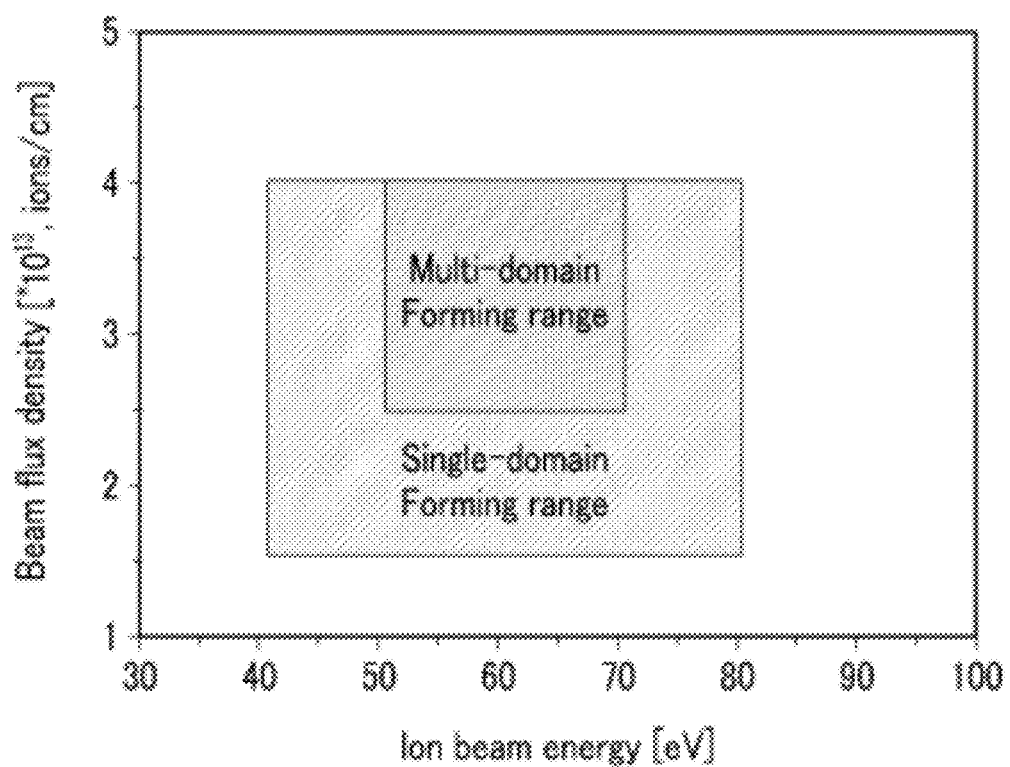
FIG. 14 is a graph illustrating a range of ion beam energy and ion beam flux density for forming a plurality of domains.
Figure 15:
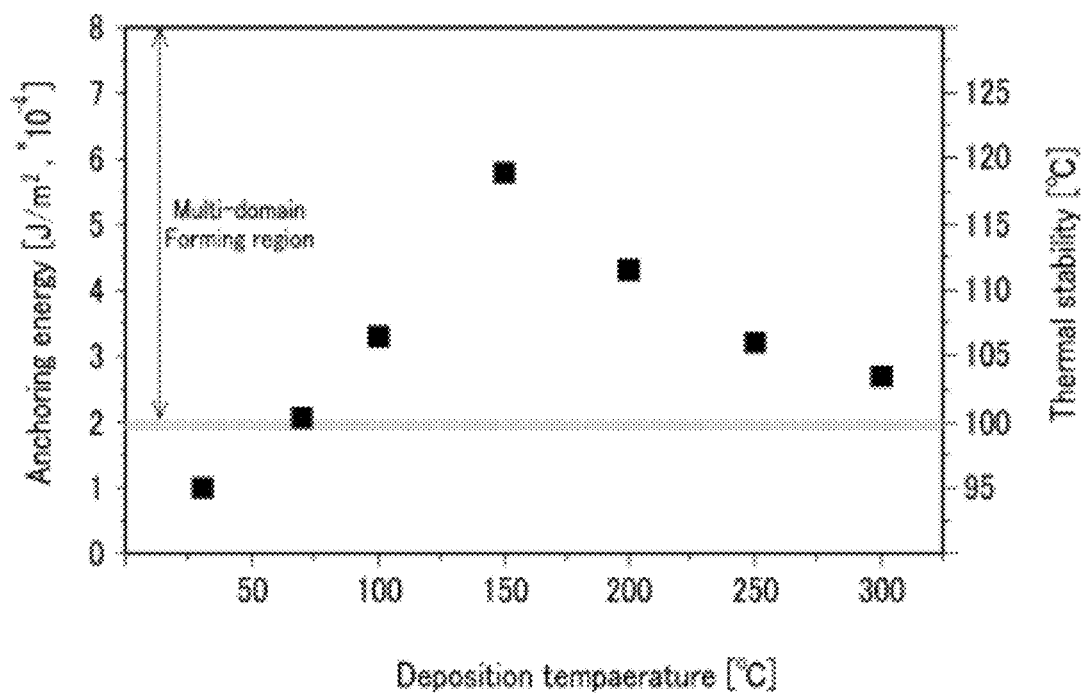
FIG. 15 is a graph illustrating anchoring energy and thermal stability according to an alignment layer forming temperature.

FIG. 12 is a graph illustrating the size of an alignment failure region according to a distance between an alignment layer and a mask. FIG. 13 is a graph illustrating a magnitude of a pretilt angle according to an incident angle of an ion beam, FIG. 14 is a graph illustrating a range of ion beam energy and an ion beam flux density for forming a plurality of domains, and FIG. 15 is a graph illustrating anchoring energy and thermal stability according to an alignment layer forming temperature.

In the experiment from which the experimental data was derived, the ion beam source was a cold hollow cathode ("CHC") type ion beam source, ion beam energy was set to about 70 eV, the incident angle of the ion beam was set to about 80°, the incident time period of the ion beam was set to about 1 sec., and the flux density of the ion beam was set to about $3.12 \times 10^{13}$ Ar$^+$/sec.cm$^2$.

Figure 16:
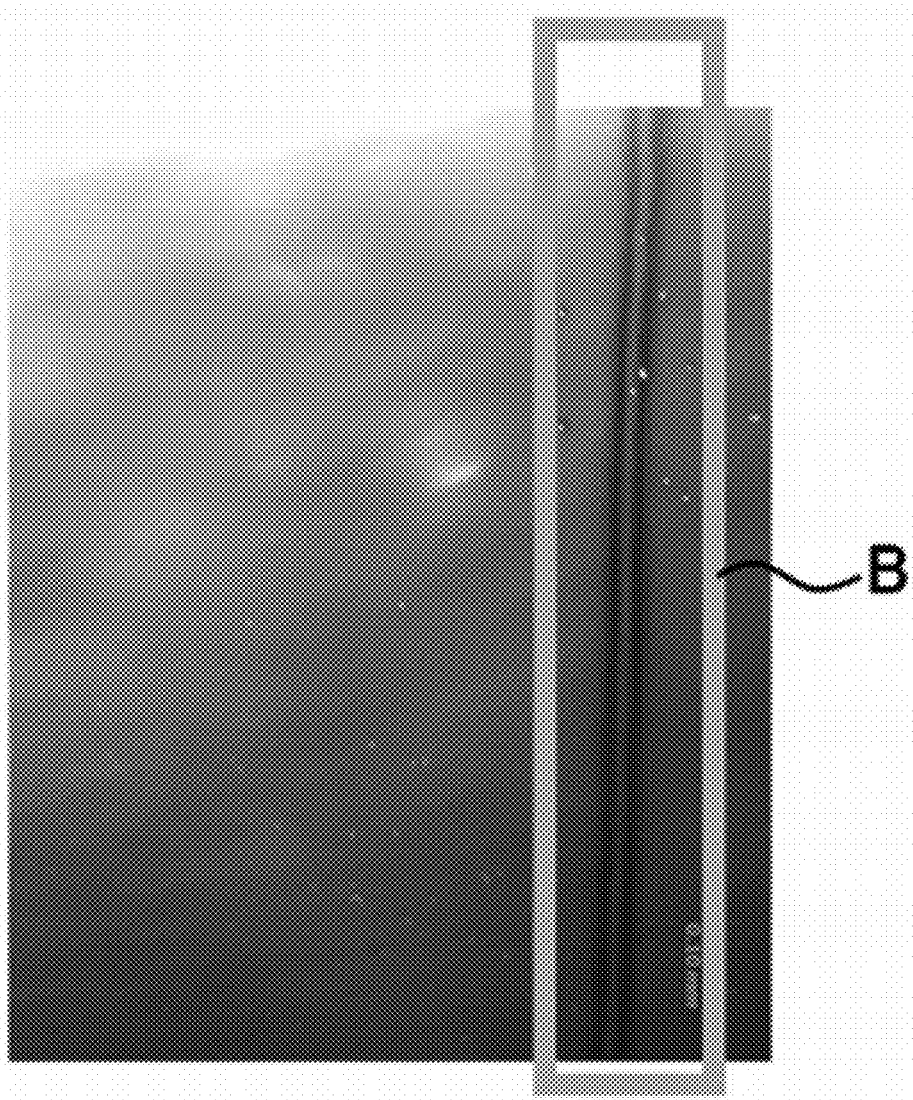
FIG. 16 is a picture illustrating a display failure according to an alignment failure region.

Referring to FIG. 12, when a distance d between the alignment layers 11 and 21 and the masks 70 and 80, respectively, is about 100 μm or less, a disclination width of an alignment failure region B may be sustained at about 20 μm or less. An alignment failure region B having a size in this range can be completely blocked by a light blocking member of the LCD. If the disclination width of the alignment failure region B is greater than about 20 μm, a display failure as shown in FIG. 16 may be generated. If a distance d between the alignment layers 11 and 21 and the masks 70 and 80, respectively, is set to about 50 μm or less, a disclination width of the alignment failure region B can be sustained at about 15 μm or less, whereby a display failure can be more effectively prevented. However, if a distance d between the alignment layers 11 and 21 and the masks 70 and 80, respectively, is set to about 20 μm or less, it may be difficult to control the masks 70 and 80. Therefore, in one exemplary embodiment, the distance between the mask and the liquid crystal alignment layer is 100 μm or less and in another exemplary embodiment, the distance between the mask and the liquid crystal alignment layers is about 20 μm to about 50 μm.

Referring to FIG. 13, when the incident angle θ of the ion beam is about 60° to about 85° and a plurality of domains are formed in one pixel (Multi-domain LC cell (left direction) and Multi-domain LC cell (right direction), it can be seen that the pretilt angle is about 85° to about 89°. In order to improve transmittance by forming a plurality of domains, it is important to form a pretilt angle. However, as the pretilt angle becomes smaller than about 85°, light leakage may occur in a normally black state at increased viewing angles, whereby a completely black state cannot be embodied from all viewing angles. Therefore, in one exemplary embodiment, a pretilt angle is in a range of about 85° to about 89°. When forming a single domain in one pixel (Single-domain LC cell), as the incident angle θ of the ion beam decreases, it can be seen that a change amount of a pretilt angle rapidly decreases.

By performing an experiment of forming one domain in one pixel and an experiment of forming a plurality of domains in one pixel, it was found that, in the pixel having a single domain, vertical alignment was formed when ion beam energy was about 40 eV to about 80 eV and ion beam flux density was about $1\text{-}4 \times 10^{13}$ Ar$^+$/sec.cm$^2$, and in the pixel having a plurality of domains, vertical alignment was formed when ion beam energy was about 50 eV to about 70 eV and ion beam flux density was about $2.5\text{-}4 \times 10^{13}$ Ar$^+$/sec.cm$^2$. Finally, in one exemplary embodiment, ion beam energy may be in a range of about 50 eV to about 70 eV in order to form a plurality of domains, and ion beam flux density may be in a range of about $2.5 \times 10^{13}$ Ar$^+$/sec.cm$^2$ to about $3.12 \times 10^{13}$ Ar$^+$/sec.cm$^2$, as shown in FIG. 14.

Referring to FIG. 15, the horizontal axis represents a deposition temperature of an inorganic layer for forming the alignment layers 11 and 21 on the pixel electrode 191, the left vertical axis represents anchoring energy, and the right vertical axis represents thermal stability. If an inorganic layer is deposited at a temperature of about 75° C. to about 300° C., it can be seen that anchoring energy of the LCD is secured to about $2 \times 10^{-4}$ J/m$^2$ or more and thermal stability thereof is secured to about 100° C. to about 120° C.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method of manufacturing a liquid crystal display, comprising:
    disposing a thin film transistor including an output terminal on a first substrate;
    disposing a pixel electrode in connection with the output terminal;
    disposing an inorganic layer on the pixel electrode; and
    converting the inorganic layer to a first alignment layer by disposing a mask on the inorganic layer and radiating an ion beam thereto,
    wherein a distance between the inorganic layer and the mask is about 20 μm to about 100 μm when radiating the ion beam.

2. The method of claim 1, wherein the converting of the inorganic layer to a first alignment layer comprises:
    dividing the first alignment layer into a plurality of stripe regions comprising first and second stripe regions and radiating the ion beam to the first stripe region in a first direction; and
    radiating the ion beam to the second stripe region adjacent to the first stripe region in a second direction substantially opposite to the first direction.

3. The method of claim 2, wherein the first stripe region and the second stripe region are formed within one pixel.

4. The method of claim 2, wherein the first stripe region and the second stripe region are formed in different pixels, respectively.

5. The method of claim 1, wherein, in the converting of the inorganic layer to a first alignment layer, an incident angle of the ion beam is about 60° to about 85° with respect to the first substrate.

6. The method of claim 5, wherein, in the converting of the inorganic layer to a first alignment layer, energy of the ion beam is about 50 eV to about 70 eV, and flux density of the ion beam is about $2.5 \times 10^{13}$ Ar$^+$/sec.cm$^2$ to about $3.12 \times 10^{13}$ Ar$^+$/sec.cm$^2$.

7. The method of claim 5, wherein, in the disposing of an inorganic layer on the pixel electrode, the inorganic layer is deposited using a high frequency magnetron sputtering method, and the deposition temperature thereof is about 75° C. to about 300° C.

8. The method of claim 7, wherein a thickness of the inorganic layer is about 50 nm.

9. The method of claim 8, wherein the inorganic layer comprises one of silicon oxide and silicon nitride.

10. The method of claim 1, wherein the ion beam source is a CHC type ion beam source.

11. The method of claim 1, wherein the ion beam comprises argon ions.

12. The method of claim 2, further comprising:
    disposing a common electrode on a second substrate disposed substantially opposite to the first substrate;
    disposing an inorganic layer on the common electrode;
    converting the inorganic layer to a second alignment layer by radiating an ion beam thereto; and
    disposing a liquid crystal layer between the first alignment layer and the second alignment layer.

13. The method of claim 12, wherein the converting of the inorganic layer to the second alignment layer comprises:

dividing the second alignment layer into a plurality of stripe regions comprising third and fourth stripe regions, and radiating an ion beam to the third stripe region in a third direction; and radiating an ion beam to the fourth stripe region adjacent to the third stripe region in a fourth direction substantially opposite to the third direction.

14. The method of claim 13, wherein the third stripe region and the fourth stripe region are formed within one pixel.

15. The method of claim 13, wherein the third stripe region and the fourth stripe region are formed in different pixels, respectively.

16. The method of claim 12, wherein the liquid crystal layer comprises a plurality of domains including at least left upper, left lower, right upper, and right lower domains.

17. The method of claim 1, wherein a distance between the inorganic layer and the mask is about 20 μm to about 50 μm when radiating the ion beam.

18. The method of claim 1, wherein the mask has an opening through which the ion beam passes, and a width of the opening is about 100 μm to about 2000 μm.

19. The method of claim 18, wherein the mask is made of one of stainless steel and aluminum.

* * * * *